US012677000B2

(12) United States Patent
Robert et al.

(10) Patent No.: US 12,677,000 B2
(45) Date of Patent: Jul. 7, 2026

(54) HMVC FOR AFFINE AND SBTMVP MOTION VECTOR PREDICTION MODES

(71) Applicant: InterDigital CE Patent Holdings, SAS, Paris (FR)

(72) Inventors: Antoine Robert, Mezieressur Couesnon (FR); Fabrice Leleannec, Betton (FR); Tangi Poirier, Torigné-Fouilland (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 285 days.

(21) Appl. No.: 17/621,116

(22) PCT Filed: Jun. 18, 2020

(86) PCT No.: PCT/EP2020/066850
§ 371 (c)(1),
(2) Date: Dec. 20, 2021

(87) PCT Pub. No.: WO2020/260110
PCT Pub. Date: Dec. 30, 2020

(65) Prior Publication Data
US 2022/0264147 A1     Aug. 18, 2022

(30) Foreign Application Priority Data

Jun. 25, 2019     (EP) ..................................... 19305843

(51) Int. Cl.
H04N 19/58          (2014.01)
H04N 19/513        (2014.01)
H04N 19/52          (2014.01)
(52) U.S. Cl.
CPC ............. H04N 19/58 (2014.11); H04N 19/52 (2014.11); H04N 19/521 (2014.11)

(58) Field of Classification Search
None
See application file for complete search history.

(56) References Cited

U.S. PATENT DOCUMENTS 9,930,363 B2      3/2018  Rusanovskyy et al.
2008/0043848 A1   2/2008  Kuhn
(Continued)

FOREIGN PATENT DOCUMENTS

CN          1335021 A    2/2002
CN        105308965 A    2/2016
(Continued)

OTHER PUBLICATIONS

Chen et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, Document: JVET-L1002-v1, 12th Meeting, Macao, China, Oct. 3, 2018, 48 pages.

(Continued)

*Primary Examiner* — Lindsay J Uhl
(74) *Attorney, Agent, or Firm* — Condo Roccia Koptiw LLP

(57) ABSTRACT

An apparatus for encoding or decoding blocks of a current picture encodes sub-blocks of a first block of a current picture. The sub-blocks encoded or decoded based on motion vectors determined according a motion information data associated with the first block. In a second step, a set of second motion information data is determined as a function of the first motion information data. These second motion information data are added to a list of motion information data, that is used to determine a motion information data for further blocks of the current picture to encode or decode.

20 Claims, 4 Drawing Sheets

(56) References Cited

U.S. PATENT DOCUMENTS

| | | | |
|---|---|---|---|
| 2014/0044181 A1 | 2/2014 | Siast et al. | |
| 2014/0140405 A1 | 5/2014 | Seregin et al. | |
| 2016/0286229 A1 | 9/2016 | Li et al. | |
| 2016/0366435 A1 | 12/2016 | Chien et al. | |
| 2018/0070090 A1 | 3/2018 | Lee et al. | |
| 2018/0139468 A1 | 5/2018 | Lin et al. | |
| 2019/0037231 A1 | 1/2019 | Ikai et al. | |
| 2019/0104319 A1 | 4/2019 | Zhang et al. | |
| 2019/0116376 A1 | 4/2019 | Chen et al. | |
| 2019/0149838 A1 | 5/2019 | Zhang et al. | |
| 2020/0099951 A1* | 3/2020 | Hung | H04N 19/55 |
| 2020/0288124 A1* | 9/2020 | Li | H04N 19/70 |
| 2021/0227211 A1* | 7/2021 | Liu | H04N 19/59 |
| 2021/0243470 A1* | 8/2021 | Solovyev | H04N 19/573 |
| 2021/0274209 A1* | 9/2021 | He | H04N 19/52 |
| 2021/0400262 A1* | 12/2021 | Li | H04N 19/513 |
| 2022/0078476 A1* | 3/2022 | Zhang | H04N 19/52 |

FOREIGN PATENT DOCUMENTS

| | | | |
|---|---|---|---|
| CN | 107409225 A | 11/2017 | |
| CN | 107483945 A | 12/2017 | |
| EP | 1968326 A2 | 9/2008 | |
| IN | 2018470375 60 A | 11/2018 | |
| RU | 2675092 C1 | 12/2018 | |
| WO | WO 2017118411 A1 | 7/2017 | |
| WO | 2017130696 A1 | 8/2017 | |
| WO | 2017148345 A1 | 9/2017 | |
| WO | 2017197126 A1 | 11/2017 | |
| WO | 2018061563 A1 | 4/2018 | |

OTHER PUBLICATIONS

Chen et al, "Description of SDR, HDR and 360 video coding by Qualcomm and Technicolor-low and high complexity versions", Joint Video Exploration Team (JVET) of ITU-T SG 16 WP 3 and ISO/IEC JTC 1/SC 29/WG 11, Document: JVET-J0021, 10th Meeting: San Diego, US, Apr. 10, 2018, 43 pages.

Zhao et al, "CE4-related: History based affine merge candidate", Joint Video Experts Team (JVET) of ITU-T SG 16 WP 3 and ISO/IEC JTC 1/SC 29/WG 11, Document: JVET-L0305, 12th Meeting: Macao, China, Oct. 3, 2018, 4 pages.

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

Anonymous, "Series H: Audiovisual and Multimedia Systems, Infrastructure of audiovisual services— Coding of moving video, High efficiency video coding", ITU-T H.265 Telecommunication Standardization Sector of ITU, Recommendation ITU-T H.265, Oct. 2014, 540 pages.

Chen et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11; Document: JVET-N1002-v1, 14th Meeting: Geneva, Switzerland, Mar. 19, 2019, 70 pages.

ISO/IEC, "Information Technology—Generic Coding of Moving Pictures and Associated Audio", International Organization for Standardization, ISO/IEC JTC1/SC29/WG11, N0702rev, Recommendation H.262, ISO/IEC 13818-2, Mar. 25, 1994, 212 pages.

ISO/IEC, "Information technology—Generic coding of moving pictures and associated audio information: Systems", International Standard ISO/IEC 13818-1:201x—Recommendation ITU-T H.222.0, Oct. 2014, 296 pages.

* cited by examiner

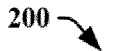
200
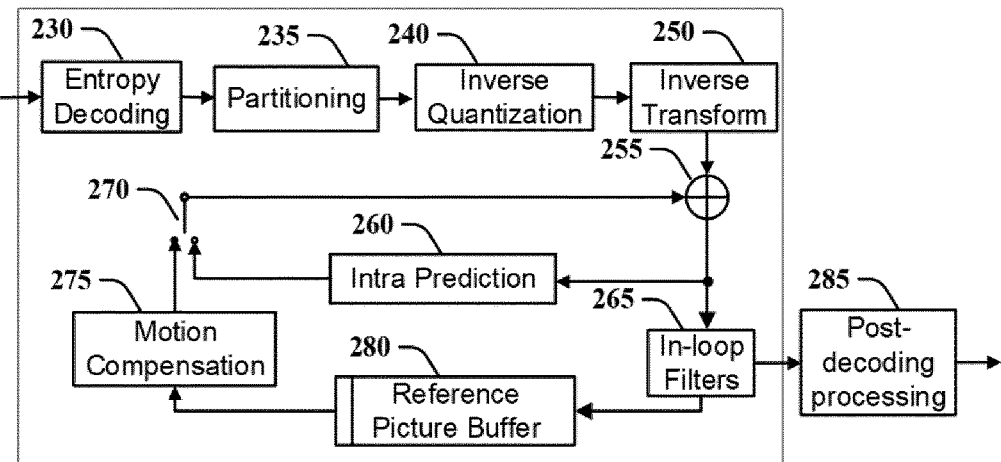
FIG. 2
1000
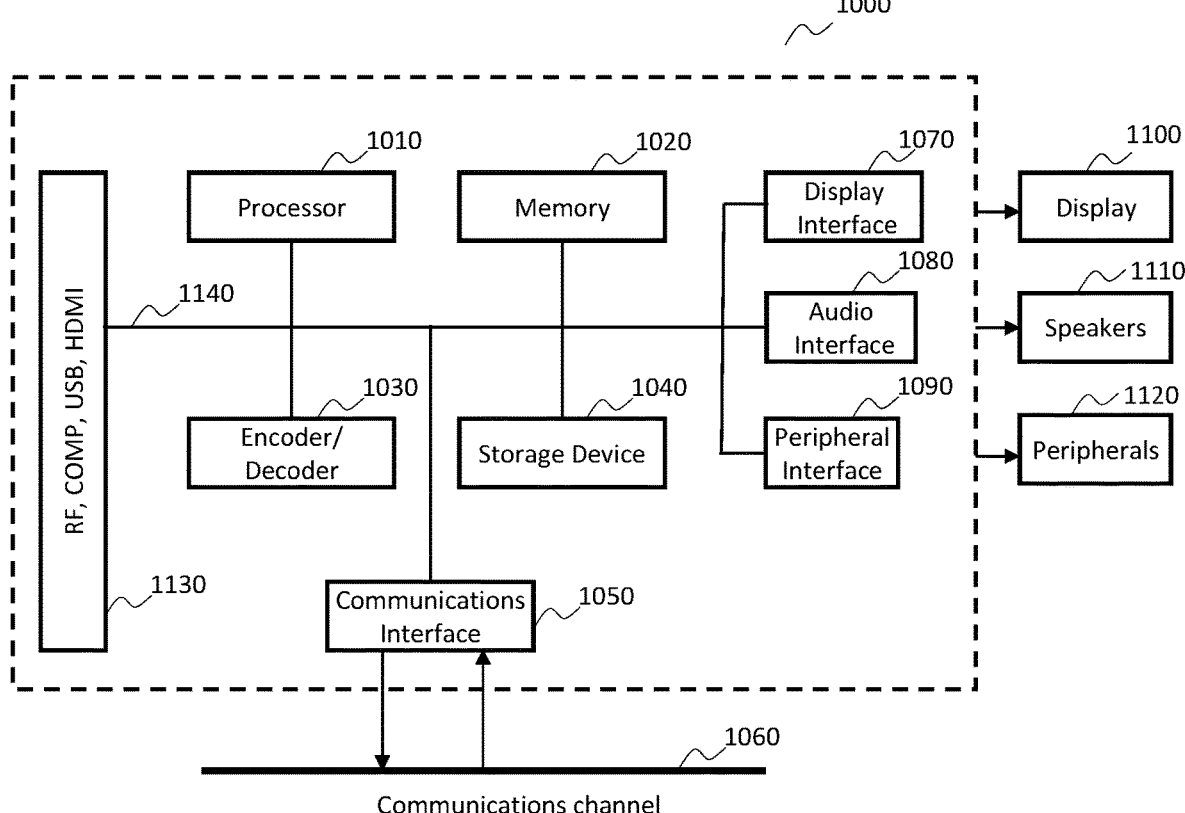
FIG. 3

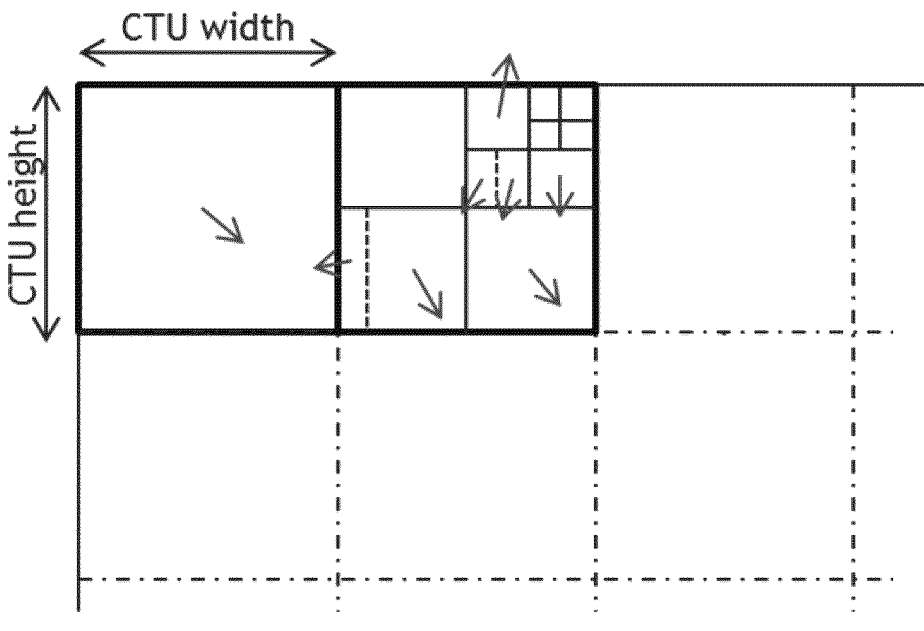
FIG. 4
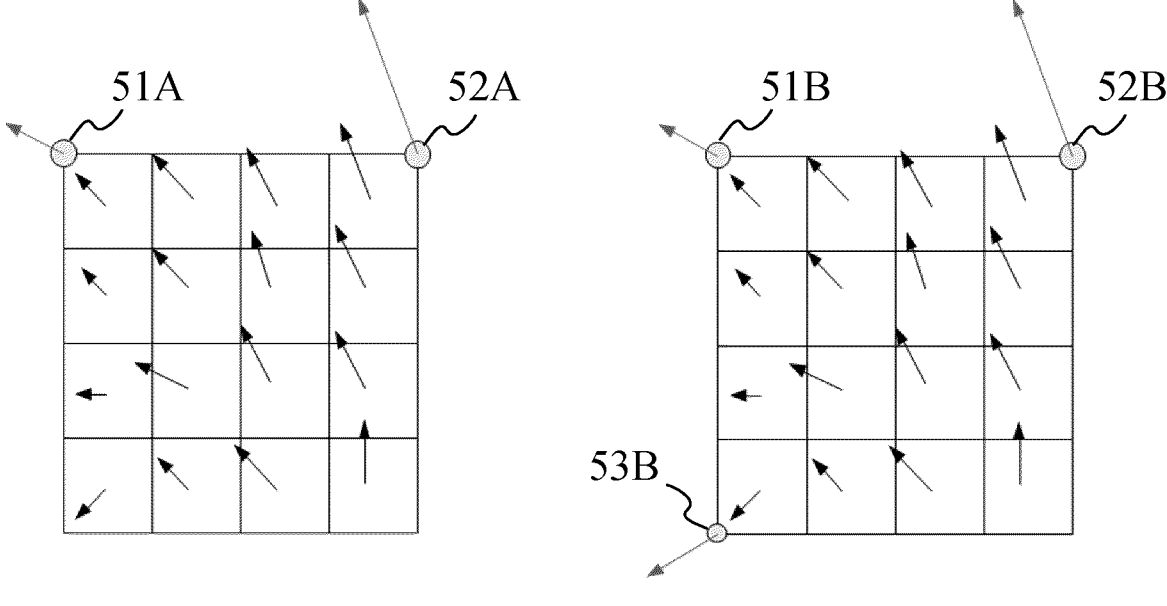
FIG. 5A                      FIG. 5B

HMVC FOR AFFINE AND SBTMVP MOTION VECTOR PREDICTION MODES

CROSS-REFERENCE TO RELATED APPLICATIONS

This application is a U.S. National Stage Entry under 35 U.S.C. 371 of Patent Cooperation Treaty Application No. PCT/EP2020/066850, filed Jun. 18, 2020, which claims the benefit of European Patent Application No. 19305843, filed Jun. 25, 2019, the contents of each of which are incorporated herein by reference in their entireties.

TECHNICAL FIELD

At least one of the present embodiments generally relates to a method or an apparatus for video encoding or decoding, and more particularly, to a method or an apparatus for coding and decoding blocks of a video picture based on motion vectors determined from previously encoded or decoded blocks.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology comprises using a motion model based on affine modeling and/or on sub-block-based temporal motion vector predictors (SbTMVP). In particular, these models are used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom). Motion field is commonly discretized in a set of motion vectors associated with sub-blocks of the block.

Recent developments in the domain also comprise using a history-based Motion Vector Prediction (HMVP) method wherein a HMVP candidate is defined as the motion information of a previously coded block. A table with multiple HMVP candidates is maintained during the encoding/decoding process. Whenever there is a non-sub-block-based inter-coded block, the associated motion information is added to the last entry of the table as a new HMVP candidate. These candidates may be used to encode/decode further blocks, in particular neighboring blocks.

However, as only non-sub-block-based inter-coded blocks contribute to the HMVP list, when a block to encode or decode is surrounded by sub-block-based inter-coded blocks, this block cannot beneficiate from motion vectors of previously encoded/decoded blocks. There is a lack for a solution to such a problem.

SUMMARY

The drawbacks and disadvantages of the prior art are addressed by the general aspects described herein, which are directed to storing motion information related to sub-block-based inter-coded blocks for encoding and decoding further blocks. According to a first aspect, there is provided a method. The method comprises steps of decoding sub-blocks of a first block of a current picture. The sub-blocks are decoded based on motion vectors determined according a first motion information data associated with the first block. The method further comprises determining a set of second motion information data as a function of said first motion information data; and adding this set of second motion information data to a list of motion information data. Items of said list may be used to determine a motion information data for a second block of the current picture.

According to another aspect, there is provided a second method. The method comprises the steps of encoding sub-blocks of a first block of a current picture. The sub-blocks are encoded based on motion vectors determined according a first motion information data associated with the first block. The method further comprises determining a set of second motion information data as a function of said first motion information data; and adding this set of second motion information data to a list of motion information data. Items of said list may be used to determine a motion information data for a second block of the current picture.

According to another aspect, there is provided an apparatus. The apparatus comprises a processor. The processor can be configured to encode blocks of a current picture of a video or decode a bitstream by executing either of the aforementioned methods.

According to another general aspect of at least one embodiment, there is provided a device comprising an apparatus according to any of the decoding embodiments; and at least one of (i) an antenna configured to receive a signal, the signal including decoded blocks of the picture, (ii) a band limiter configured to limit the received signal to a band of frequencies that includes the decoded blocks of the picture, and (iii) a display configured to display an output representative of the decoded blocks of the picture.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF THE DRAWINGS

FIG. 2 illustrates a block diagram of a video decoder;

FIG. 3 illustrates a block diagram of an example of a system in which various aspects and embodiments are implemented;

FIG. 4 illustrates coding tree and coding tree units (CTU) structures used to represent compressed pictures, for instance according to HEVC video compression standard;

FIGS. 5A and 5B illustrates a 4×4 sub-block based affine motion vector field for respectively two and three control points;

DETAILED DESCRIPTION

The general aspects described here are in the field of video compression. These aspects aim at improving compression efficiency compared to existing video compression systems.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
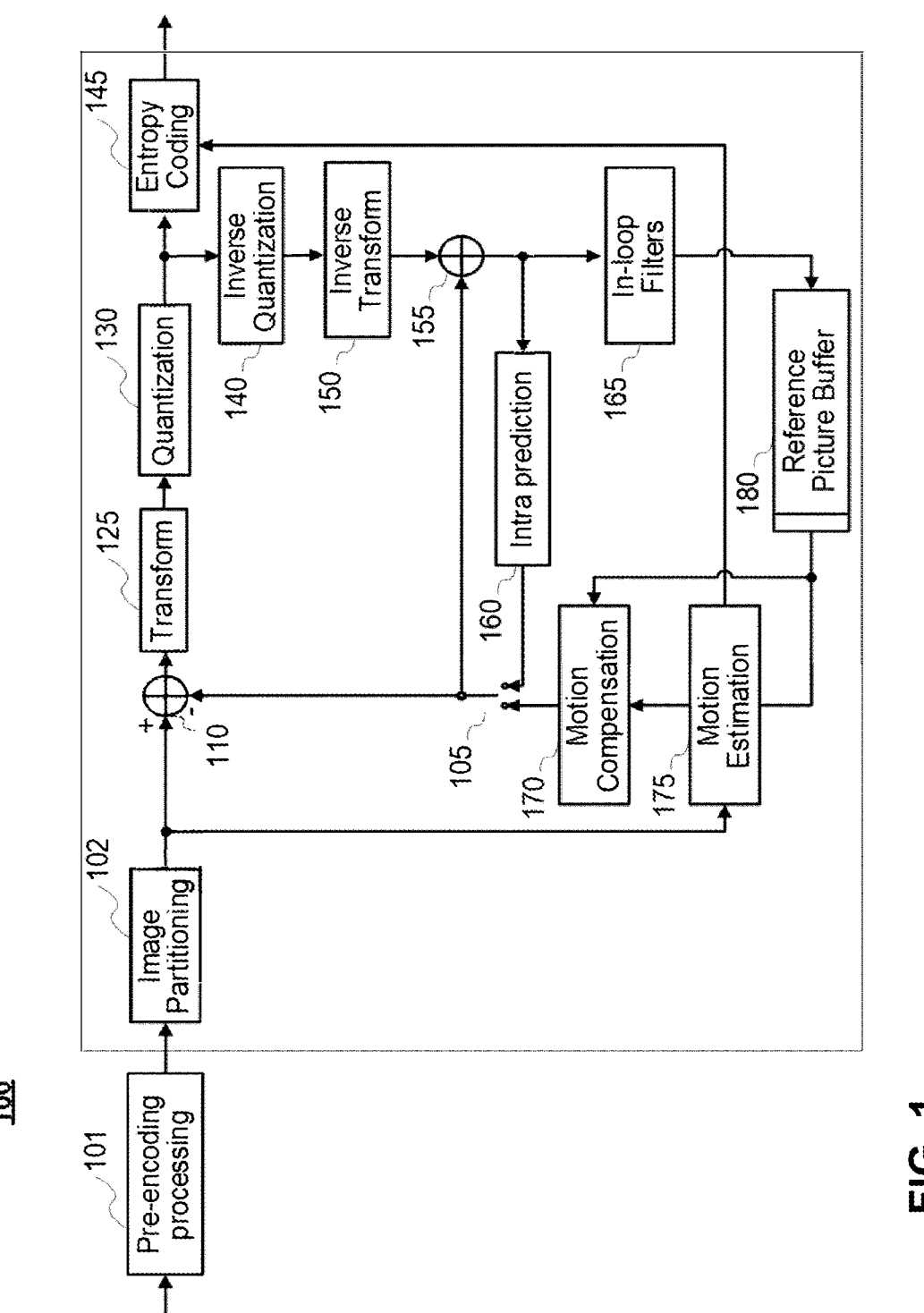
FIG. 1 illustrates an encoder.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation modules 170 and 275, of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates an encoder 100. Variations of this encoder 100 are contemplated, but the encoder 100 is described below for purposes of clarity without describing all expected variations.

Before being encoded, the video sequence may go through pre-encoding processing 101, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device

1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display.

The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

FIG. 4 illustrates coding tree and coding tree units (CTU) structures used to represent compressed pictures, for instance according to HEVC video compression standard. In video compression standards, like in HEVC, motion compensated temporal prediction is employed to exploit the redundancy that exists between successive pictures of a video. A motion vector is associated with each prediction unit (PU) comprised in a CTU. The set of CTUs of the picture is represented as a Coding Tree in the compressed domain. This is a quad-tree division of the CTU, where each leaf is called a Coding Unit (CU). Each CU is given some Intra or Inter prediction parameters (Prediction Info). To do so, a CU is spatially partitioned into one or more Prediction Units (PUs), each PU being assigned some prediction information. The Intra or Inter coding mode is assigned on the CU level. One Motion Vector is assigned to each PU in HEVC. This motion vector is used for motion compensated temporal prediction of the considered PU. Therefore, in a video compression standard like HEVC, the motion model which links a predicted block and its reference block consists in a translation.

FIGS. 5A and 5B illustrates a 4×4 sub-block based affine motion vector field for respectively two and three control points. Recent addition to video compression standards, like in the Joint Exploration Model (JEM) and later VVC (Versatile Video Coding) test model developed by the JVET (Joint Video Exploration Team) group, some richer motion models are supported to improve temporal prediction. In that aim, a PU may be spatially divided into sub-PU and a richer model may be used to assign each sub-PU a dedicated motion vector. A CU is no more divided into PU or TU, and some motion data is directly assigned to each CU. In this new codec design, a CU can be divided into sub-CU and a motion vector can be computed for each sub-CU. One of the new motion models introduced in the JEM is the affine model, which consists in using an affine model to represent the motion vectors in a CU.

The affine motion field for 2 control points of FIG. 5A, also called the 4-parameter affine model, consists in motion vector component values for each position (x, y) inside the considered block according to equation [eq 1]:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{[eq 1]}$$

Where $(v_{0x}, v_{0y})$ and $(v_{1x}, v_{1y})$ are the so-called control point motion vectors 51A and 52A used to generate the affine motion field. $(v_{0x}, v_{0y})$ is the motion vector top-left corner control point. $(v_{1x}, v_{1y})$ is the motion vector top-right corner control point.

A model with 3 control points as illustrated in FIG. 5B, called the 6-parameter affine motion model, can also be used to represent the sub-block-based motion field of a given coding unit. The motion field in the case of the 6-parameter affine model is computed as in equation [eq 2] where $(v_{0x}, v_{0y})$ is vector 51B, $(v_{1x}, v_{1y})$ is vector 52B and $(v_{2x}, v_{2y})$ is vector 53B.

$$\begin{cases} v_x = \dfrac{(v_{1x} - v_{0x})}{w}x + \dfrac{(v_{2,x} - v_{0,x})}{h}y + v_{0x} \\ v_y = \dfrac{(v_{1y} - v_{0y})}{w}x + \dfrac{(v_{2,y} - v_{0,y})}{h}y + v_{0y} \end{cases} \quad \text{[eq 2]}$$

In practice, to keep complexity reasonable, a same motion vector is computed for pixels of a 4×4 sub-block (sub-CU) of the considered CU, as illustrated in FIG. 5A and in FIG. 5B. An affine motion vector is computed from the control point motion vectors, at the position of the center of each sub-block. Thus, obtained motion vectors are represented at 1/16-pixel accuracy. As a result, the prediction unit (PU) of a coding unit in the affine mode is built through the motion compensated prediction of each sub-block with its own motion vector. Affine motion compensation can be used in 2 ways in the VVC Test Model (VTM): Affine AMVP and Affine Merge. They are introduced in the following.

In the VTM, a CU, which size is larger than 8×8, can be predicted in Affine AMVP mode. This is signaled through a flag in the bit-stream coded at CU level. The generation of the Affine Motion Field for that inter CU includes determining control point motion vectors (CPMV), which are obtained by the decoder through the addition of a motion vector difference plus a control point motion vector prediction (CPMVP). The CPMVP is a pair (for a 4-parameters affine model specified by 2 control point motion vectors) or a triplet (for a 6-parameters affine model specified by 3 control point motion vectors) of motion vectors used as predictors of the CPMV of the current CU. The CPMVP of current CU can be inherited from affine neighboring CUs (as in the Affine Merge mode). The spatial position from which inherited CPMVP are retrieved selected among the ordered list of given candidate positions. An inherited CPMVP is considered as valid if its reference picture is equal to the reference picture of the current CU.

In Affine Merge mode, a CU-level flag indicates if a CU in merge mode employs affine motion compensation. If so, then, in the JEM, the first available neighboring CU that has been coded in an Affine mode is selected among the ordered list of given candidate positions. Once the first neighboring CU in Affine mode is obtained, then CPMVP of current CU can be inherited from this affine neighboring CU. The 3 motion vectors $(\vec{v_3}, \vec{v_4}, \vec{v_5})$ from the top-left, top-right and bottom-left corners of the neighboring affine CU are retrieved (see FIG. 5B). Based on these three motion vectors, the two or three CPMVs of the top-left, top-right and/or bottom-left corners of current CU $(\vec{v_0}, \vec{v_1}, \vec{v_2})$ are derived as follows.

For a CU with a 4-parameter affine mode, the 2 CPMVs of current CU are derived as follows:

$$\overrightarrow{D_{hor}} = \frac{(\vec{v_4} - \vec{v_3})}{W_{neighb}}$$

$$\overrightarrow{D_{ver}} = \left(\frac{-\overrightarrow{D_{hor}} \cdot y}{\overrightarrow{D_{hor}} \cdot x}\right)$$

$$\vec{v_0} = \vec{v_3} + \overrightarrow{D_{hor}} \times (X_{cur} - X_{nei}) + \overrightarrow{D_{ver}} \times (Y_{cur} - Y_{nei})$$

$$\vec{v_1} = \vec{v_3} + \overrightarrow{D_{hor}} \times (X_{cur} + W_{cur} - X_{nei}) + \overrightarrow{D_{ver}} \times (Y_{cur} - Y_{nei})$$

For a CU in 6-parameter affine mode, the 3 Control Point Motion Vectors of current CU are derived as follows:

$$\overrightarrow{D_{hor}} = \frac{(\vec{v_4} - \vec{v_3})}{W_{neighb}}$$

$$\overrightarrow{D_{ver}} = \frac{(\vec{v_5} - \vec{v_3})}{H_{neighb}}$$

$$\vec{v_0} = \vec{v_3} + \overrightarrow{D_{hor}} \times (X_{cur} - X_{nei}) + \overrightarrow{D_{ver}} \times (Y_{cur} - Y_{nei})$$

$$\vec{v_1} = \vec{v_3} + \overrightarrow{D_{hor}} \times (X_{cur} + W_{cur} - X_{nei}) + \overrightarrow{D_{ver}} \times (Y_{cur} - Y_{nei})$$

$$\vec{v_2} = \vec{v_3} + \overrightarrow{D_{hor}} \times (X_{cur} - X_{nei}) + \overrightarrow{D_{ver}} \times (Y_{cur} + H_{cur} - Y_{nei})$$

When the control point motion vectors $\vec{v_0}$, $\vec{v_1}$ and $\vec{v_2}$ of current CU are obtained, the motion field inside current CU is computed on a 4×4 sub-block basis, through the model of equation [eq 1] or [eq 2]. So Affine model may be considered as a sub-block-based model.

Since VTM-3.0, the SbTMVP (Sub-block-based Temporal Motion Vector Predictor also called ATMVP) candidate is part of the affine merge list as the first sub-block candidate to be evaluated in the Rate-Distortion Optimization process of the affine merge mode. SbTMVP predicts the motion vectors of the 8×8 sub-blocks within the current CU, by collecting the motion information of the corresponding sub-blocks in the collocated picture as the regular TMVP predictor.

Figures 6, 7:
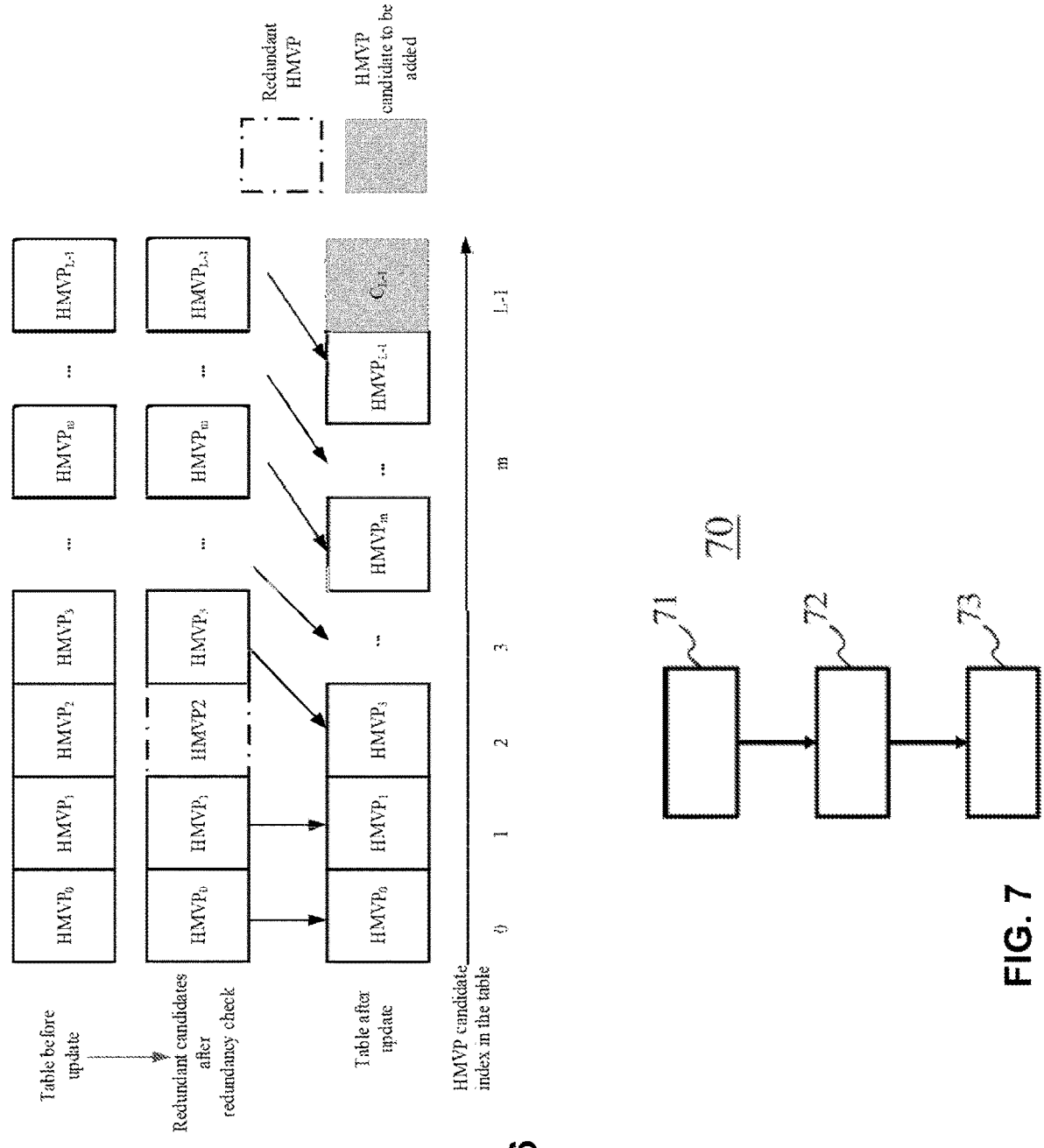
FIG. 6 illustrates an example of updating a list in a HMVP method.
FIG. 7 diagrammatically illustrates a method 70 for encoding/decoding blocks of a current picture.

FIG. 6 shows an example of updating the list in a HMVP method. The tool History-based Motion Vector Prediction (HMVP) has also been introduced since the VTM-3.0. History-based consists in maintaining a list made of multiple motion information (motion vectors, associated reference frame, BCW index, . . . ) which have been used for the coding/decoding of CUs preceding the current CU. Each time a non-affine and non-triangle inter CU is coded/decoded, that is a non-sub-block-based block, the associated motion information is inserted at the end of the list, as a new HMVP candidate. As illustrated in FIG. 6, when inserting a new motion candidate to the table, a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP).

According to the present principles, motion information related to the inter CUs coded with a sub-block mode, that is blocks for which sub-blocks are decoded based on motion vectors determined according a motion information data associated with the block, are added to a list of motion information data, like the HMVP list. Items of said list are used to determine a motion information data for further blocks of the same current picture. Since affine and SbTMVP modes use a sub-block-based motion compensation, several motion vectors are stored for each CU coded with a sub-block mode. The position within the CU, i.e. the sub-block, from where the motion vector to be saved in the list is picked may influence the BD-rate performances.

Currently, the motion information coming from CUs coded with a sub-block or triangle modes are not considered in the HMVP list construction and update. According to the present principles, none, one or several motion information data determined according to the inter CUs coded with a sub-block mode are inserted into the HMVP list as a regular inter motion information.

The present principles apply to every sub-block coding modes. Sub-block coding modes are not restricted to the 3 modes of VTM-5.0: (i) affine AMVP, (ii) affine merge and (iii) SbTMVP; But extend to all already known sub-block modes as planar motion vector, regression, triangle, FRUC, interweaved affine, etc., and to all new sub-block modes that can be proposed in the future. It is possible to consider only one of these sub-block modes in HMVP list savings, or combination of modes (as, for example, both affine modes), or a combination of all sub-block modes.

FIG. 7 diagrammatically illustrates a method 70 for encoding/decoding blocks of a current picture. At a step 71, a first block to be encoded/decoded according to a sub-block mode is encoded/decoded. Motion vectors used to encode/decode sub-blocks of the first block are determined according to motion information comprised in the CU of the first block itself as illustrated, for example in FIGS. 5A and 5B. A motion information data comprises different data used for motion prediction, for example, motion vectors, associated reference frame, BCW index, etc.

According to the present principles, at a step 72, a set of second motion information data is determined as a function of said first motion information data; The number of determined motion information data in the set may be zero, one or several. The choice of the size of this set is guided by the efficiency of this choice for the encoding/decoding process. It is parametrized and shared by the encoder and the decoder. Related parameters may be encoded in headers of the video stream.

In an embodiment, a second motion information is built with data of the first motion information, that is the motion information associated with the first block. The motion vector of a second motion information is determined as a function of a sub-set of motion vectors determined for sub-blocks of the first block. Sub-blocks providing their motion vector for the combination (i.e. the function of motion vectors) are selected according to their position within the first block. For example, a unique sub-block is selected, for instance, a sub-block centered in the first block (e.g. in case of a 4×4 sub-block division, sub-block [1,1] or [1,2]) and the function is the identity function. Thus, the motion vector of the determined second motion information data is the motion vector of the selected sub-block. In another example, the motion vector of the second motion information data is an average of motion vectors of two or three or four motion vectors of sub-blocks selected for the distribution of their positions within the first block, for instance two centered sub-blocks or three sub-blocks: two in the up corners and one at the bottom center or four sub-blocks in the corners of the first block. The function may be different than an average. The choice of the function and the positions of selected sub-blocks is guided by the efficiency of this choice for the encoding/decoding process. It is parametrized and shared by the encoder and the decoder. Related parameters may be encoded in headers of the video stream.

In another embodiment, a second motion information data comprises a motion vector determined as a function of motion vectors of the first motion information data. For example, for a first block encoded/decoded according to the 4-parameter affine model, the motion vector of the second motion information data may be a weighted average of the two control point vectors. Zero, one or several motion information data may be determined according to this embodiment with different functions and/or different parameters.

According to a variant applicable to the two embodiments above, the chosen function of motion vectors and/or the position of the selected sub-blocks depends on the size of the first block and/or the size of the sub-blocks. For instance, if the first block is smaller than a given size (e.g. 128×128, 64×64, 32×32 or 16×16), the function is the identity and the selected sub-block is chosen at the center of the first block; but if the first block is bigger than the given size, the function is a weighted average (weights depending on the size of the first block) of two vectors of sub-blocks in corners of the first block.

According to a variant, the number of determined second motion information data depends on the size of the first block and/or on the size of the sub-blocks. For example, if the size of the first block is smaller than a given size, no second motion data is determined. In another example, the sub-blocks of the first block may be divided into regions of fixed size as, (e.g. 64×64, 32×32 or 16×16) or of an adaptive size as, for example, regions that divided the sub-block CU by 2, 4 or 8. For these regions, one second motion information data is determined according to one of the embodiment and variant above. For example, if the regions are of fixed size 32×32, then, for a 16×32 sub-block CU, only one second motion information data is determined, and for a 64×64 sub-block CU, four second motion information data are determined. In another example, if the regions are of adaptive size and divide the sub-block CU into four regions, then there are always four motion information data that are saved, for a 16×32 sub-block CU, one for each 8×16, and for a 64×64 sub-block CU, one for each 32×32.

The choice of the number of determine second motion information data and the different functions for their determining is guided by the efficiency of this choice for the encoding/decoding process. It is parametrized and shared by the encoder and the decoder. Related parameters may be encoded in headers of the video stream. For example, an efficient choice may be to determine one motion information data with the motion vector of a centered sub-block only for sub-blocks whose area is greater than or equal to 256 square pixels.

At a step 73 of method 70 of FIG. 7, the determined set of motion information data is added to a list of motion information data, for example the HMVP list of VCC Test Model. This list is defined in that its items are used to determine a motion information data for further blocks of said current picture to be encoded/decoded.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, managing motion information data lists to feed motion prediction modules 170 and 275 of FIG. 1 and FIG. 2.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, managing motion information data lists to feed motion prediction modules 170 and 275 of FIG. 1 and FIG. 2.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for determining second information data from sub-block mode encoded blocks. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method comprising:
    decoding sub-blocks of a first block of a current picture, the sub-blocks being decoded based on first sub-block motion vectors determined according to first motion information data associated with the first block;

determining a second motion vector as a combination of at least two first sub-block motion vectors of sub-blocks selected from spatially distinct positions in the first block; and
    adding the second motion vector to a History-based Motion Vector Prediction (HMVP) list of motion information data, items of the HMVP list being used to determine a motion information data for a second block of the current picture.

2. An apparatus for decoding blocks of a current picture, the apparatus comprising a processor configured for:
    decoding sub-blocks of a first block of a current picture, the sub-blocks being decoded based on first sub-block motion vectors determined according to first motion information data associated with the first block;
    determining a second motion vector as a combination of at least two first sub-block motion vectors of sub-blocks selected from spatially distinct positions in the first block; and
    adding the second motion vector to a History-based Motion Vector Prediction (HMVP) list of motion information data, items of the HMVP list being used to determine a motion information data for a second block of the current picture.

3. A method comprising:
    encoding sub-blocks of a first block of a current picture, the sub-blocks being encoded based on first sub-block motion vectors determined according to first motion information data associated with the first block;
    determining a second motion vector as a combination of at least two first sub-block motion vectors of sub-blocks selected from spatially distinct positions in the first block; and
    adding the second motion vector to a History-based Motion Vector Prediction (HMVP) list of motion information data, items of the HMVP list being used to determine a motion information data for a second block of the current picture.

4. An apparatus for encoding blocks of a current picture, the apparatus comprising a processor configured for:
    encoding sub-blocks of a first block of a current picture, the sub-blocks being encoded based on first sub-block motion vectors determined according to first motion information data associated with the first block;
    determining a second motion vector as a combination of at least two first sub-block motion vectors of sub-blocks selected from spatially distinct positions in the first block; and
    adding the second motion vector to a History-based Motion Vector Prediction (HMVP) list of motion information data, items of the HMVP list being used to determine a motion information data for a second block of the current picture.

5. The method of claim 1, wherein the combination of the at least two first sub-block motion vectors depends on a size of the first block or on a size of the sub-blocks.

6. A device comprising:
    the apparatus of claim 2; and
    at least one of (i) an antenna configured to receive a signal, the signal including the decoded blocks of the current picture, (ii) a band limiter configured to limit the received signal to a band of frequencies that includes the decoded blocks of the current picture, or (iii) a display configured to display an output representative of the decoded blocks of the current picture.

7. A non-transitory computer readable medium containing data content generated according to the method of claim 3, for playback using a processor.

8. The apparatus of claim 2, wherein the combination of the at least two first sub-block motion vectors depends on a size of the first block or on a size of the sub-blocks.

9. The method of claim 3, wherein the combination of the at least two first sub-block motion vectors depends on a size of the first block or on a size of the sub-blocks.

10. The apparatus of claim 4, wherein the combination of the at least two first sub-block motion vectors depends on a size of the first block or on a size of the sub-blocks.

11. A non-transitory computer-readable storage medium storing instructions that, when executed by a processor, cause the processor to perform the method of claim 1.

12. A non-transitory computer-readable storage medium storing instructions that, when executed by a processor, cause the processor to perform the method of claim 3.

13. The method of claim 1, wherein the combination of at least two first sub-block motion vectors of sub-blocks selected from spatially distinct positions of the first block is an average of the at least two first sub-block motion vectors selected from spatially distinct positions of the first block.

14. The method of claim 1, wherein determining a second motion vector as a combination of at least two first sub-block motion vectors of sub-blocks selected from spatially distinct positions of the first block comprises determining the second motion vector by computing a weighted average of at least two first sub-block motion vectors selected from spatially distinct positions of the first block, wherein weights of the weighted average and/or the spatially distinct positions are determined as a function of a size of the first block.

15. The apparatus of claim 2, wherein the combination of at least two first sub-block motion vectors of sub-blocks selected from spatially distinct positions of the first block is an average of the at least two first sub-block motion vectors selected from spatially distinct positions of the first block.

16. The apparatus of claim 2, wherein determining a second motion vector as a combination of at least two first sub-block motion vectors of sub-blocks selected from spatially distinct positions of the first block comprises determining the second motion vector by computing a weighted average of at least two first sub-block motion vectors selected from spatially distinct positions of the first block, wherein weights of the weighted average and/or the spatially distinct positions are determined as a function of a size of the first block.

17. The method of claim 3, wherein the combination of at least two first sub-block motion vectors of sub-blocks selected from spatially distinct positions of the first block is an average of the at least two first sub-block motion vectors selected from spatially distinct positions of the first block.

18. The method of claim 3, wherein determining a second motion vector as a combination of at least two first sub-block motion vectors of sub-blocks selected from spatially distinct positions of the first block comprises determining the second motion vector by computing a weighted average of at least two first sub-block motion vectors selected from spatially distinct positions of the first block, wherein weights of the weighted average and/or the spatially distinct positions are determined as a function of a size of the first block.

19. The apparatus of claim 4, wherein the combination of at least two first sub-block motion vectors of sub-blocks selected from spatially distinct positions of the first block is an average of the at least two first sub-block motion vectors selected from spatially distinct positions of the first block.

20. The apparatus of claim 4, wherein determining a second motion vector as a combination of at least two first sub-block motion vectors of sub-blocks selected from spatially distinct positions of the first block comprises determining the second motion vector by computing a weighted average of at least two first sub-block motion vectors selected from spatially distinct positions of the first block, wherein weights of the weighted average and/or the spatially distinct positions are determined as a function of a size of the first block.

* * * * *